(12) United States Patent
Yunger et al.

(10) Patent No.: US 12,154,340 B2
(45) Date of Patent: Nov. 26, 2024

(54) AUTOMATED EXAMINATION PROCTOR

(71) Applicant: Vaital, Bellevue, WA (US)

(72) Inventors: David Yunger, Bellevue, WA (US);
Matthew Bartels, Bellevue, WA (US);
Garegin Petrosyan, Yerevan (AM);
Artak Chopuryan, Yerevan (AM)

(73) Assignee: Vaital, Bellevue, WA (US)

( * ) Notice: Subject to any disclaimer, the term of this patent is extended or adjusted under 35 U.S.C. 154(b) by 298 days.

(21) Appl. No.: 17/538,843

(22) Filed: Nov. 30, 2021

(65) Prior Publication Data

US 2022/0172482 A1    Jun. 2, 2022

Related U.S. Application Data (60) Provisional application No. 63/119,525, filed on Nov. 30, 2020.

(51) Int. Cl.
*G06V 20/52* (2022.01)
*G06F 18/21* (2023.01)
*G06V 10/82* (2022.01)
*G06V 20/40* (2022.01)
*G06V 40/10* (2022.01)

(52) U.S. Cl.
CPC .............. *G06V 20/52* (2022.01); *G06F 18/21* (2023.01); *G06V 10/82* (2022.01); *G06V 20/40* (2022.01); *G06V 40/10* (2022.01)

(58) Field of Classification Search
None
See application file for complete search history.

(56) References Cited

U.S. PATENT DOCUMENTS

| | | | |
|---|---|---|---|
| 10,452,897 B1 * | 10/2019 | Benkreira | G06V 40/172 |
| 10,657,364 B2 * | 5/2020 | El-Khamy | G06V 10/82 |
| 10,962,939 B1 * | 3/2021 | Das | G06F 16/3344 |
| 11,270,139 B2 * | 3/2022 | Zhang | G06F 18/2415 |
| 11,526,725 B2 * | 12/2022 | Kursun | G06F 18/24 |
| 11,651,229 B2 * | 5/2023 | Cheng | G06F 18/23213 |
| | | | 382/118 |
| 11,714,961 B2 * | 8/2023 | Gardner | G06V 30/19173 |
| | | | 726/28 |

(Continued)

OTHER PUBLICATIONS

Nagpal S, Singh M, Singh R, Vatsa M. Deep learning for face recognition: Pride or prejudiced ?. arXiv preprint arXiv:1904.01219. Apr. 2, 2019. (Year: 2019).*

(Continued)

*Primary Examiner* — Michelle M Entezari Hausmann
(74) *Attorney, Agent, or Firm* — Perkins Coie LLP (57) ABSTRACT

A system is provided for performing a validation of an examination environment. The system acquires a video of the examination environment. The system applies one or more machine learning models to images (frames) of the video to indicate whether the image includes a prohibited item. A machine learning model may be trained using images of items labeled with an indication of whether an image includes a prohibited item. The system determines whether the validation has passed based on whether an image includes a prohibited item. The system notifies a proctor of when the validation has not passed and provides (Continued)

to the proctor an indication of an image that contains a prohibited item. The proctor then decides whether the validation should pass or fail.

20 Claims, 6 Drawing Sheets

(56) References Cited

U.S. PATENT DOCUMENTS

| | | | | |
|---|---|---|---|---|
| 11,983,845 | B1* | 5/2024 | Frank | G06F 3/04842 |
| 11,987,264 | B2* | 5/2024 | Thakur | G06N 3/045 |
| 12,056,949 | B1* | 8/2024 | Sun | G06F 18/2178 |
| 2003/0185340 | A1 | 10/2003 | Frantz | |
| 2015/0193651 | A1* | 7/2015 | Gleim | G06V 40/172 |
| | | | | 382/118 |
| 2016/0035233 | A1 | 2/2016 | Breed | |
| 2016/0308859 | A1* | 10/2016 | Barry | G07C 9/22 |
| 2017/0039869 | A1 | 2/2017 | Gleim et al. | |
| 2018/0028896 | A1* | 2/2018 | Ray | H04N 7/183 |
| 2019/0196888 | A1 | 6/2019 | Anderson et al. | |
| 2019/0304297 | A1* | 10/2019 | Burley, IV | G08G 1/04 |
| 2019/0311101 | A1* | 10/2019 | Nienhouse | A61B 5/1176 |
| 2020/0175885 | A1* | 6/2020 | Lelo | G09B 7/00 |
| 2020/0388135 | A1* | 12/2020 | Vaknin | G08B 21/08 |
| 2020/0394442 | A1* | 12/2020 | Ahmed | G06V 10/764 |
| 2021/0272467 | A1* | 9/2021 | Yang | G06F 3/017 |
| 2022/0036488 | A1* | 2/2022 | Brutsche | G06Q 50/205 |
| 2023/0040513 | A1* | 2/2023 | Ryan | G06V 20/52 |

OTHER PUBLICATIONS

Atoum Y, Chen L, Liu AX, Hsu SD, Liu X. Automated online exam proctoring. IEEE Transactions on Multimedia. Jan. 20, 2017;19(7): 1609-24. (Year: 2017).*

Gopane, Santosh, et al. "Cheat Detection in Online Examinations Using Artificial Intelligence." Asean Engineering Journal 14.1 (2024): 121-128. (Year: 2024).*

Moyo, Reuben, et al. "Using CNN to Detect the Use of Mobile Phone in Examination Rooms." 2023 First International Conference on the Advancements of Artificial Intelligence in African Context (AAIAC). IEEE, 2023. (Year: 2023).*

Abozaid, Ahmed, and Ayman Atia. "Multi-modal online exam cheating detection." 2022 International Conference on Electrical, Computer and Energy Technologies (ICECET). IEEE, 2022. (Year: 2022).*

Guney, Caner, Onur Akinci, and Kadir Çamoğlu. "Artificial Learning-Based Proctoring Solution for Remote Online Assessments: "Vproctor"." The International Archives of the Photogrammetry, Remote Sensing and Spatial Information Sciences 46 (2021): 235-238. (Year: 2021).*

Zaffar, Aqeel, Muhammad Jawad, and Muzammil Shabbir. "A Novel CNN-RNN Model for E-Cheating Detection Based on Video Surveillance." University of Wah Journal of Computer Science 5 (2023): 1-13. (Year: 2023).*

International Search Report and Written Opinion issued in Application No. PCT/US21/61262, dated Apr. 14, 2022, 11 pages.

* cited by examiner

AUTOMATED EXAMINATION PROCTOR

CROSS-REFERENCE TO RELATED APPLICATION(S)

This application claims the benefit of priority to U.S. Provisional Application No. 63/119,525 filed on Nov. 30, 2020, which is hereby incorporated by reference in its entirety.

BACKGROUND

Many types of examinations are administered that require the presence of a proctor to ensure that an examinee is not cheating. The types of examinations that may require a proctor include college tests (e.g., for a physics class), college admission tests (e.g., ACT, GMAT, and LSAT), professional licensing tests (e.g., for nursing, financial planning or accounting), certification tests (e.g., for IT/cloud certification from technology companies such as Microsoft or Amazon), continuing education tests, job qualification tests, and so on.

Although examinations have been proctored for many decades, if not centuries, the proctoring has focused on detecting cheating by notes written on hands or paper, excessive looking at another examinee or at their answers, and so on. The recent widespread use of electronic devices, however, has made it easier for an examinee to cheat while making it more difficult for a proctor to detect cheating. For example, examinees have tried to cheat using smartphones, wireless earpieces, smartglasses, smartwatches, and so on. So, in most examination environments, such devices are prohibited. It may take several minutes for a proctor to verify that one examinee does not have a prohibited item. The proctor may have to search the examinee's pockets, coat, briefcase, shoes, and so on.

Because of health concerns and efficiency concerns, it may be desirable to allow examinations to be taken at remote locations such as in the examinee's home. Such examinations are typically taken online using a computer. It is, however, impractical to have a proctor at each remote location to check for cheating. Some attempts have been made to let a proctor monitor an examination from a location other than the examination location, for example, using a video feed. It is very difficult, however, to detecting many types of cheating by remote monitoring, for example, via a camera of the computer on which the examination is being conducted. For example, the computer could be set up with a second monitor through which another person could view the examination questions, steal and/or redistribute the examination content, and whisper, write down, or otherwise communicate answers to the examinee.

DETAILED DESCRIPTION

Methods and systems for automatically proctoring an examination are provided. In some embodiments, an automated proctoring (AP) system provides for pre-examination monitoring of an examination to verify the identity of the examinee and to ensure that the examination environment (e.g., a room) does not include any prohibited items and does include required items. The AP system coordinates the verification of the identity of the examinee by acquiring an image of the examinee prior to the start of the examination and comparing the acquired image to an authoritative image of the examinee. The authoritative image may be part of an identification issued by, for example, a government, a university, and so on. The authoritative image may also have been acquired during a verification process when the examinee signed up for the examination. The identification may be a passport, a driver's license, a student identification, and so on. If the identity cannot be verified, the AP system may present the acquired image and the authoritative image to a proctor (i.e., a person) at a remote location who can then determine whether the identity of the examinee can be verified. If the identity cannot be verified, the proctor may direct the acquiring of another image of the examinee. The process of identification can be repeated, or the proctor may simply view the newly acquired image to determine whether the identity can be verified. If the identity cannot be verified, the AP system may prevent or notify the proctor who may prevent the examination from proceeding or employ other methods to verify the identity such as voice recognition, fingerprints, eye scans, and other biometric verification techniques.

In some embodiments, the AP system may also ensure that the examination environment does not include prohibited items and does include required items. The prohibited items may include electronic devices, food items, whiteboards, papers, books, another person, and so on. The prohibited electronic items may include smartphones, laptops, smartglasses, smartwatches, earbuds, headsets, and so on. The required items may include a pencil, paper, a calculator, and so on. To check for prohibited and required items, the AP system may acquire a video of the examination environment. For example, the video may be a 360° scan of the room in which the examinee is taking the examination. The scan may be taken, for example, by a mobile phone camera, a laptop camera, a web cam, a 360° camera mounted on the computer through which the examinee is taking the examination, a camera held by the examinee or another person, and so on. A scan may include multiple videos and/or photos collected from different positions within the examination environment. The AP system may then evaluate each frame (i.e., environment image) to determine whether the frame includes a prohibited or required item. The AP system may employ various techniques to perform the evaluation. For example, one technique may be to segment the frame into items and then determine whether each item corresponds to a prohibited or required item. Another technique may be to input a frame into a machine learning model which outputs an indication of whether the frame includes any prohibited or required items. If a prohibited item is found in a frame, the AP system may present the frame (and the time the frame was collected) to a proctor who can determine whether the frame does include a prohibited item. If so, the proctor may direct that the item be removed from the examination environment, that another video be collected, and that the frames of the new video be evaluated. Similarly, if no frame includes a required item, the proctor may be presented the video to confirm that a required item is not included. If not included, the proctor may direct that the required item be moved to the examination environment, that another video be collected, and that the frames of the new video be evaluated. If a prohibited item is included or a required item is not included in the examination environment, the proctor may prevent the examination from proceeding.

During the examination, the AP system may continually, periodically, or at random times repeat the process of determining whether the examination environment does not include a prohibited item and includes the required items. The AP system may also verify the identity of the examinee to ensure that an impostor has not taken the place of the examinee. If the examination environment does include a prohibited item or does not include a required item, the AP system may request a proctor to determine whether to continue with or terminate the examination.

In some embodiments, the AP system may monitor the examination without having a proctor available during the examination. After the examination is complete, a proctor can review the frames identified by the AP system as including prohibited items or as not including a required item and the image of the examinee if not verified. Based on the review, the proctor can determine whether the examination is a valid examination.

In some embodiments, the AP system may employ various machine learning (ML) techniques to verify identities and to check for items. For example, the AP system may train an identity verification ML model using training data with pairs of images that include an authoritative image and another image labeled with an indication of whether the images of the pair are of the same person. The training data may have been collected, for example, from images collected at security checkpoints such as at an airport. The training data may also include images with different light conditions, for example, images of dark-skinned people with a dark background and light-skinned people with a light background to help remove any bias because of lighting conditions. The AP system may train an environment verification ML model using training data that includes images labeled with the type of items they include. The images may be collected, for example, from online videos (e.g., YouTube videos), specially acquired videos, and so on. The AP system may employ one environment verification ML model that is trained to identify any type of item or multiple environment ML models that are each trained to identify a single type of item or a category of types of items (e.g., electronic devices or persons). The AP system may employ a moving window of frames to help prevent incorrect identification of items. With a moving window of frames, the AP system may indicate that a frame contains a prohibited or required item only when the environment verification ML model indicates that all or a certain percentage of the frames in the window include the same type of item at the same location. The use of a moving window reduces the chance of incorrectly identifying that an item is included in the examination environment.

The ML models may be based on various ML techniques such as a convolutional neural network (CNN), a neural network, a generative adversarial network, a support vector machine, and so on. Depending on the type of ML technique, the training data may include the images themselves or feature vectors with features derived from the images. The AP system may employ different ML techniques for the identity verification ML model and the environment verification ML model. The AP system may also use a combination of ML techniques such as an autoencoder to generate a latent feature vector for an image and a neural network to identify items given a latent feature vector. The identity verification ML model may output a probability that the examinee image and the authoritative image are of the same person. The environment verification ML model may output, for each frame, a probability for each type of item. If a probability for a type of item is above a threshold value, the AP system may indicate that the frame includes an item of that type. The AP system may also combine the probabilities of each frame within a moving window for each type of item to determine whether the frames of the moving window include an item of each type. The AP system may output metrics such as confidence scores (e.g., 0-100) indicating confidence in or accuracy of the identity of the person and the type of item.

In some embodiments, the AP system may be configurable to allow different items to be designated as prohibited or required depending on the requirements of the organization administering the examination. For example, some organizations may consider a calculator to be a prohibited item. Other organizations may consider a calculator to be a required item. Yet other organizations may consider a calculator to be neither prohibited nor required.

Figure 1:
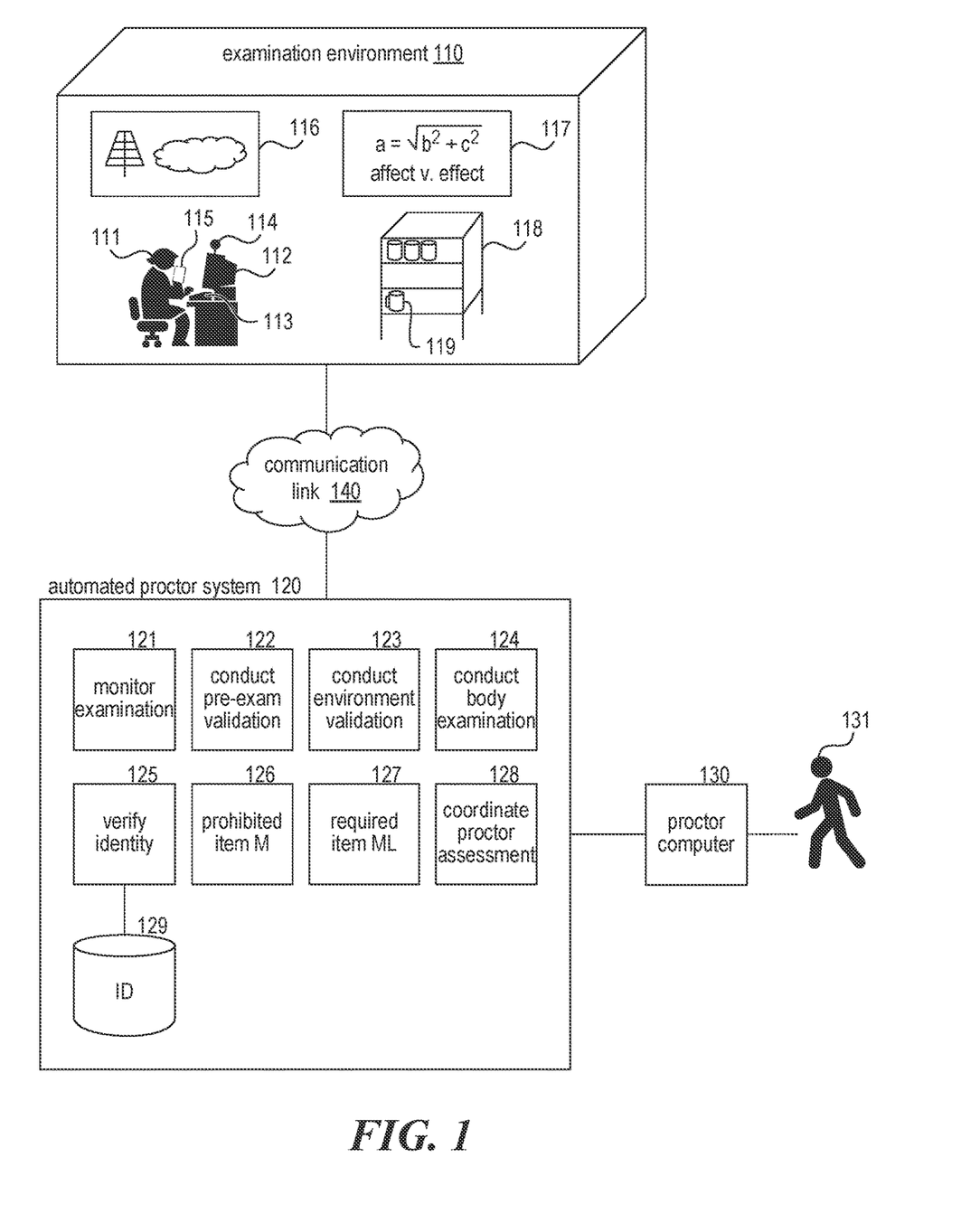
FIG. 1 is a diagram illustrating an examination environment and automated proctor system in some embodiments.

FIG. 1 is a diagram illustrating an examination environment and an automated proctor system in some embodiments. The examination environment 110 may be a room within the examinee's home. The room may include an examinee 111, a computer 112, a keyboard 113, a camera 114, and a smartphone 115. The room may also include a picture 116, a whiteboard 117, a bookshelf 118, and a coffee mug 119. The smartphone, whiteboard, and coffee mug may be prohibited items. The AP system 120 includes a monitor examination component 121, a conduct pre-examination validation component 122, a conduct environment validation component 123, a conduct body examination component 124, a verify identity component 125, a prohibited item ML model 126, a required item ML model 127, a coordinate proctor assessment component 128, and an authoritative identification data store 129. The examination environment and the automated proctor system are connected with communication link 140. The monitor examination component controls the overall monitoring of the examination. The conduct pre-examination validation component coordinates the validation of the examinee and the examination environment prior to the start of the examination. The conduct environment validation component coordinates the validation of the examination environment either before or during the examination. The verify identity component performs the verification of identities. The prohibited item ML model and the required item ML model check for prohibited items and required items, respectively. The coordinate proctor assessment component interfaces with a proctor computer 130 to allow a proctor 131 to validate the assessments made by the automated proctor system. The authoritative identification data store 129 may store data including authoritative images collected from identifications of examinees. The authoritative images may also be collected during pre-examination processing by scanning an authoritative identification, downloading from a microchip that is part of the authoritative identification, and so on.

The computing systems on which the AP system may be implemented may include a central processing unit, input devices, output devices (e.g., display devices and speakers), storage devices (e.g., memory and disk drives), network interfaces, graphics processing units, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include desktop computers, laptops, tablets, e-readers, personal digital assistants, smartphones, gaming devices, servers, and so on. The computing systems may access computer-readable media that include computer-readable storage media (or mediums) and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on it or may be encoded with computer-executable instructions or logic that implements the AP system. The data transmission media is used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys. The computing systems may be servers that are housed in a data center such as a cloud-based data center.

The AP system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the AP system may be implemented in hardware using, for example, an application-specific integrated circuit (ASIC) or a field programmable gate array (FPGA).

Figure 2:
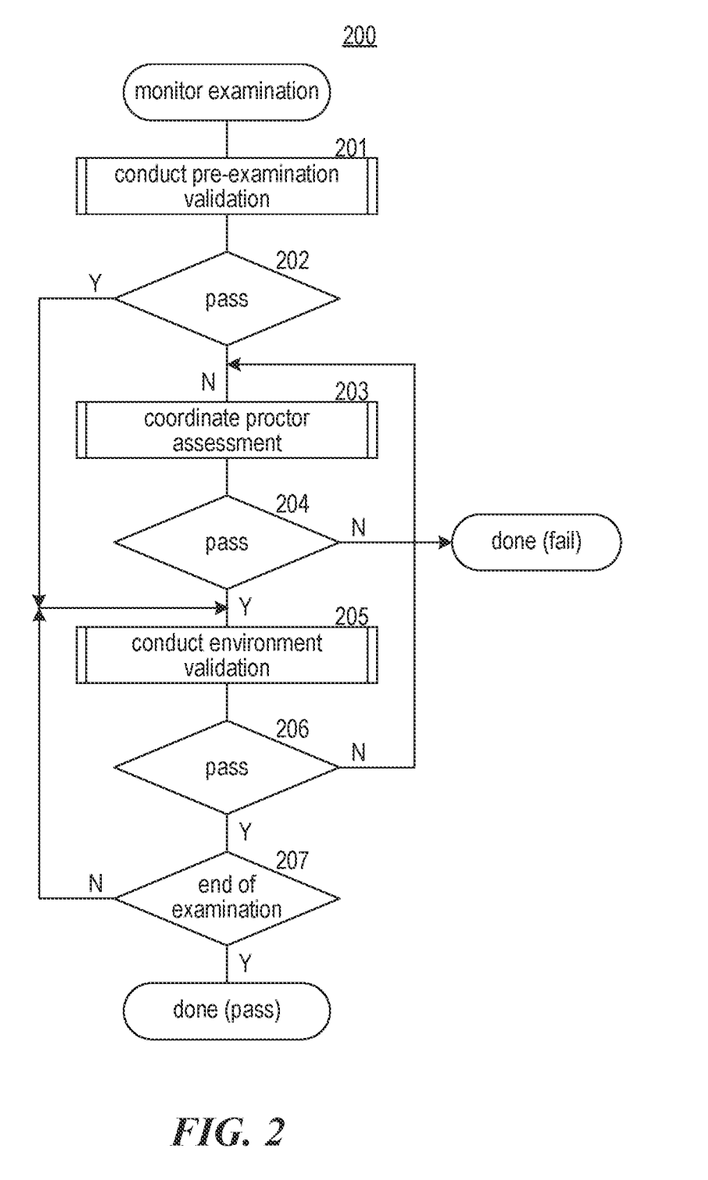
FIG. 2 is a flow diagram that illustrates the processing of a monitor examination component of the automated proctor system in some embodiments.

FIG. 2 is a flow diagram that illustrates the processing of a monitor examination component of the automated proctor system in some embodiments. The monitor examination component 200 monitors the overall examination process. In block 201, the component invokes a conduct pre-examination validation component to perform a pre-examination validation of identity and the examination environment. In decision block 202, if the pre-examination validation has passed, then the component continues at block 205, else the component continues at block 203. In block 203, the component invokes a coordinate proctor assessment component to allow a proctor to assess whether the pre-examination validation has passed or failed. In decision block 204, if the proctor has indicated that the pre-examination validation has passed, then the component continues at block 205 to monitor the examination, else the component completes indicating that the pre-examination validation has failed. In block 205, the component invokes a conduct environment validation component to perform a validation of the examination environment. In decision block 206, if validation of the examination environment has passed, then the component continues at block 207, else the component loops to block 203 to coordinate a proctor assessment. In decision block 207, if the examination has completed, then the component completes indicating that the validation of the examination has passed, else the component loops to block 205 to conduct the next validation of the examination environment.

Figure 3:
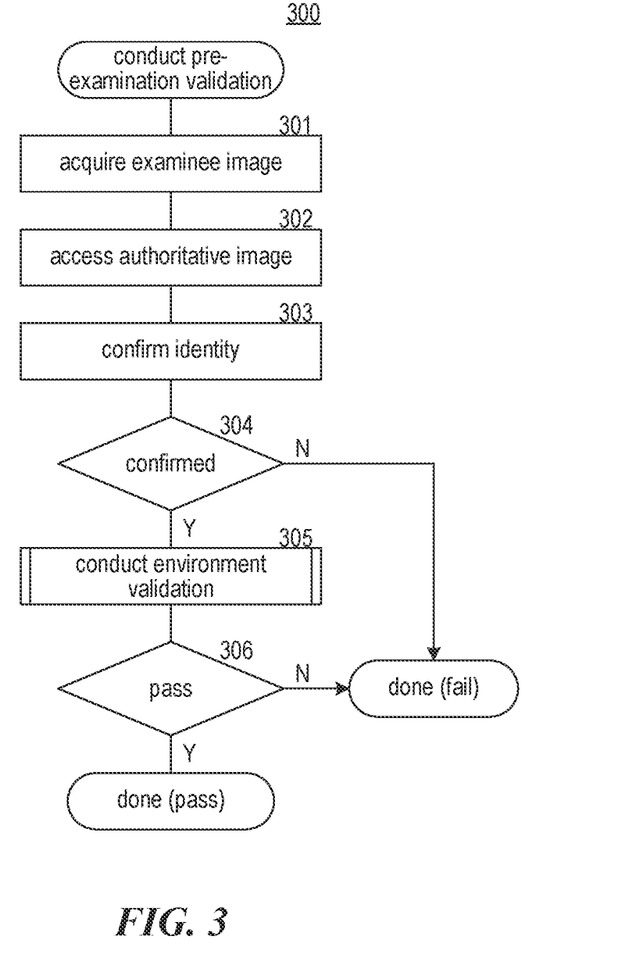
FIG. 3 is a flow diagram that illustrates the processing of a conduct pre-examination validation component of the automated proctor system in some embodiments.

FIG. 3 is a flow diagram that illustrates the processing of a conduct pre-examination validation component of the automated proctor system in some embodiments. The conduct pre-examination validation component 300 validates both the identification of the examinee and the examination environment. In block 301, the component acquires an examinee image. In block 302, the component accesses an authoritative image of the examinee. In block 303, the component confirms whether the examinee image and the authoritative image represent the same person. In decision block 304, if the identity is confirmed, then the component continues at block 305, else the component completes indicating that the pre-examination validation has failed. In block 305, the component invokes a conduct environment validation component to validate the examination environment. In decision block 306, if the examination environment validation has passed, then the component completes indicating that the examination environment validation has passed, else the component completes indicating that the examination environment validation has failed.

Figure 4:
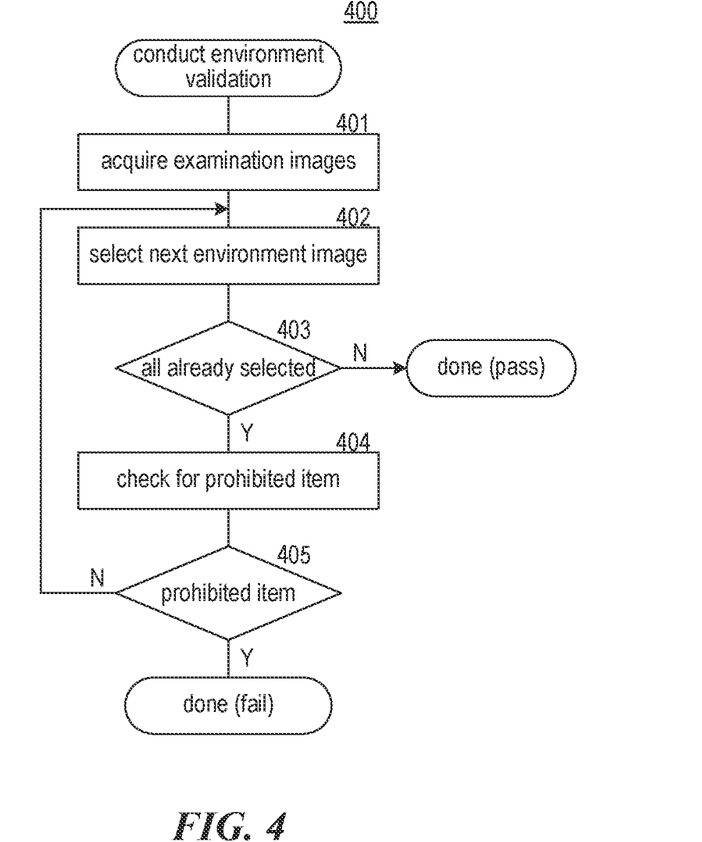
FIG. 4 is a flow diagram that illustrates the processing of a conduct environment validation component of the automated proctor system in some embodiments.

FIG. 4 is a flow diagram that illustrates the processing of a conduct environment validation component of the automated proctor system in some embodiments. The conduct environment validation component 400 is invoked to check for prohibited items. In block 401, the component acquires examination images, for example, a 360° video of the examination environment. In blocks 402-405, the component loops checking each image. In block 402, the component selects the next environment image. In decision block 403, if all the environment images have already been selected, then the component completes indicating that the examination environment validation has passed, else the component continues at block 404. In block 404, the component checks the image for any prohibited items. In decision block 405, if a prohibited item is identified, then the component completes indicating that the examination environment validation has failed, else the component loops to block 402 to select the next environment image. Although not illustrated, the environment validation component may be adapted to check for required items. Such an adapted component determines, after all the images have been processed, whether all the required items have been identified. If not, the AP system directs an assessment by the proctor.

Figure 5:
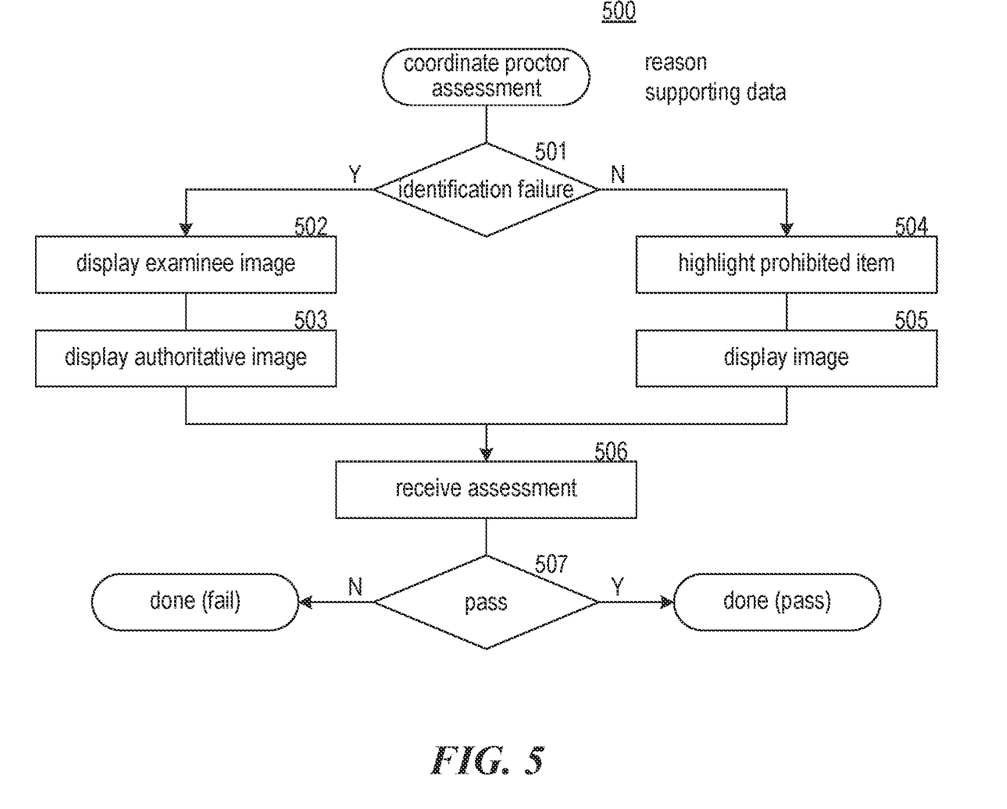
FIG. 5 is a flow diagram that illustrates the processing of a coordinate proctor assessment component of the automated proctor system in some embodiments.

FIG. 5 is a flow diagram that illustrates the processing of a coordinate proctor assessment component of the automated proctor system in some embodiments. The coordinate proctor assessment component 500 is provided a reason for the assessment and supporting data. The reason may be that a prohibited item has been identified, and the supporting data may be frames of a moving window that include the prohibited item. In decision block 501, if the reason is an identification failure, then the component continues at block 502, else the component continues at block 504. In block 502, the component displays the examinee image to the proctor. In block 503, the component displays the authoritative image to the proctor and continues at block 506. In block 504, the component highlights the prohibited item within an image or images of the moving window. In block 505, the component displays the image(s) to the proctor and continues at block 506. In block 506, the component receives an assessment from the proctor. In decision block

507, if the assessment is a pass, then the component completes indicating that the assessment has passed, else the component completes indicating that the assessment has failed.

Figure 6:
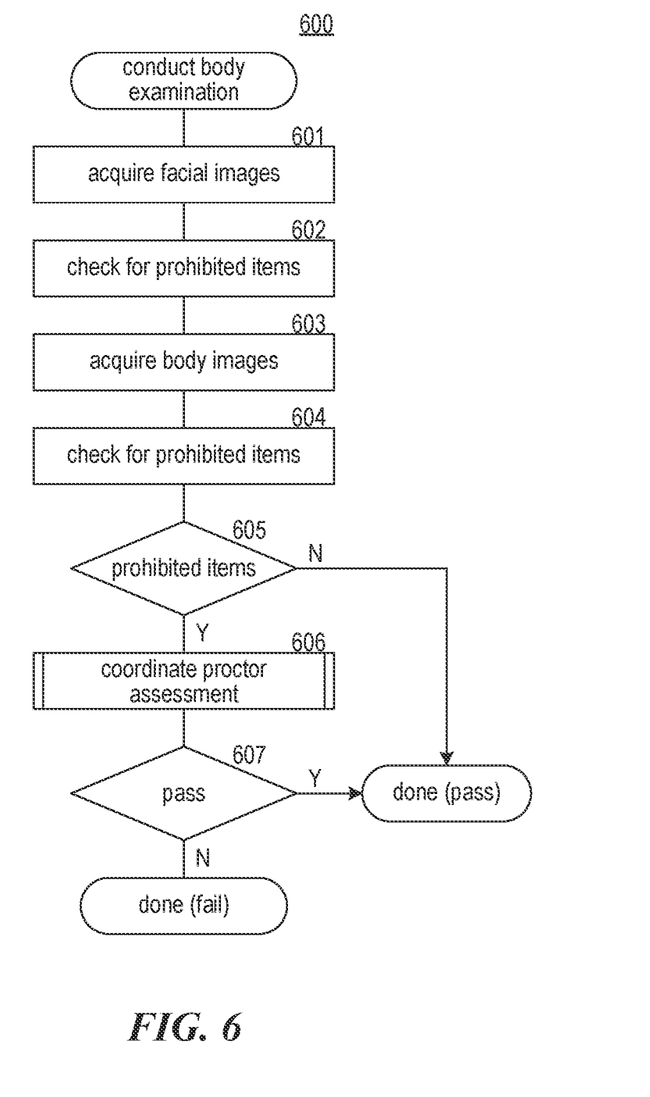
FIG. 6 is a flow diagram that illustrates the processing of a conduct body examination component of the automated proctor system in some embodiments.

FIG. 6 is a flow diagram that illustrates the processing of a conduct body examination component of the automated proctor system in some embodiments. The conduct body examination component 600 is invoked to conduct a body examination of the examinee to check for prohibited items. In block 601, the component acquires facial images of the examinee (e.g., left and right profiles). In block 602, the component checks the facial image for prohibited items. The component may employ an ML model trained specifically to identify prohibited items that may be located on the face. In block 603, the component acquires body images (e.g., left and right arms and hands). In block 604, the component checks for prohibited items. Again, the component may employ an ML model trained specifically to identify prohibited items that may be located on the body. In decision block 605, if a prohibited item is identified, then the component continues at block 606, else the component completes indicating that the body examination has passed. In block 606, the component invokes the coordinate proctor assessment component to allow the proctor to assess whether the body examination has passed. In decision block 607, if the proctor indicates that the body examination has passed, then the component completes indicating a pass, else the component completes indicating the failure.

An ML model may be any of a variety or combination of classifiers including neural networks such as fully connected, convolutional, recurrent, autoencoder, or restricted Boltzmann machine, a support vector machine, a Bayesian classifier, and so on. When the classifier is a deep neural network, the training results in a set of weights for the activation functions of the deep neural network. A support vector machine operates by finding a hyper-surface in the space of possible inputs. The hyper-surface attempts to split the positive examples (e.g., feature vectors for photographs) from the negative examples (e.g., feature vectors for graphics) by maximizing the distance between the nearest of the positive and negative examples to the hyper-surface. This step allows for correct classification of data that is similar to but not identical to the training data. Various techniques can be used to train a support vector machine.

Adaptive boosting is an iterative process that runs multiple tests on a collection of training data. Adaptive boosting transforms a weak learning algorithm (an algorithm that performs at a level only slightly better than chance) into a strong learning algorithm (an algorithm that displays a low error rate). The weak learning algorithm is run on different subsets of the training data. The algorithm concentrates more and more on those examples in which its predecessors tended to show mistakes. The algorithm corrects the errors made by earlier weak learners. The algorithm is adaptive because it adjusts to the error rates of its predecessors. Adaptive boosting combines rough and moderately inaccurate rules of thumb to create a high-performance algorithm. Adaptive boosting combines the results of each separately run test into a single, very accurate classifier. Adaptive boosting may use weak classifiers that are single-split trees with only two leaf nodes.

A neural network model has three major components: architecture, cost function, and search algorithm. The architecture defines the functional form relating the inputs to the outputs (in terms of network topology, unit connectivity, and activation functions). The search in weight space for a set of weights that minimizes the objective function is the training process. In one embodiment, the classification system may use a radial basis function (RBF) network and a standard gradient descent as the search technique.

A CNN has multiple layers such as a convolutional layer, a rectified linear unit (ReLU) layer, a pooling layer, a fully connected (FC) layer, and so on. Some more complex CNNs may have multiple convolutional layers, ReLU layers, pooling layers, and FC layers.

The ReLU layer may have a node for each node of the convolutional layer that generates a feature value. The generated feature values form a ReLU feature map. The ReLU layer applies a filter to each feature value of a convolutional feature map to generate feature values for a ReLU feature map. For example, a filter such as max(0, activation value) may be used to ensure that the feature values of the ReLU feature map are not negative.

The pooling layer may be used to reduce the size of the ReLU feature map by downsampling the ReLU feature map to form a pooling feature map. The pooling layer includes a pooling function that inputs a group of feature values of the ReLU feature map and outputs a feature value.

The FC layer includes some number of nodes that are each connected to every feature value of the pooling feature maps. Each node has a filter with its own set of weights.

The following paragraphs describe various embodiments of aspects of the AP system. An implementation of the AP system may employ any combination of the embodiments. The processing described below may be performed by a computing device with a processor that executes computer-executable instructions stored on a computer-readable storage medium that implements the AP system.

In some embodiments, a method performed by one or more computing systems is provided to monitor an examination. The method performs a pre-examination validation prior to the examination that includes acquiring a pre-examination examinee image of an examinee, determining whether the pre-examination examinee image matches an authoritative image associated with an identification authority, acquiring pre-examination environment images of an examination environment, determining whether the pre-examination environment images include prohibited items and required items, and determining whether the pre-examination validation has passed based on whether the pre-examination examinee image and the authoritative image are of the same person and whether the pre-examination environment images do not include a prohibited item and do include required items. The method further performs performing an examination validation during the examination that includes, acquiring examination environment images of the examination environment, determining whether the examination environment images include prohibited items and required items, and determining whether the examination validation has passed based on whether the whether the examination environment images do not include a prohibited item and do include required items. In some embodiments, the pre-examination environment images are frames of a pre-examination video and the examination environment images are frames of an examination video. In some embodiments, upon determining that pre-examination validation has not passed, the method provides to an examination proctor the pre-examination examinee image, pre-examination environment images, or both and a reason why the pre-examination validation did not pass. In some embodiments, upon determining that the examination validation has not passed, the method provides to an examination proctor examination environment images that indicate a reason why the examination validation did not pass. In some embodiments, the performing of the examination validation includes acquiring an examination examinee image of the examinee during the examination and determining whether the examination validation has passed based on whether the examination examinee image and the authoritative image are of the same person. In some embodiments, the determining of whether the examination environment images include prohibited items and required items includes applying one or more machine learning models to an examination environment image to output an indication of whether the examination environment image includes a prohibited item or includes a required item. In some embodiments, the prohibited items include one or more of a smartphone, a smartwatch, an earpiece, a headset, a computing device, a food item, and a person. In some embodiments, the images are collected using a 360-degree camera.

In some embodiments, a method performed by one or more computing systems is provided to perform a validation of an examination environment. The method acquires an image of the examination environment. The method applies one or more machine learning models to an image to output an indication of whether the image includes a prohibited item. The machine learning model may be trained using images of items labeled with an indication of whether an image includes a prohibited item. The method determines whether the validation has passed based on whether an image includes a prohibited item. The method notifies a proctor of whether the validation has not passed, the notifying including providing an indication of an image that contains a prohibited item. In some embodiments, a machine learning model is a convolutional neural network. In some embodiments, a machine learning model is trained using a generative adversarial network. In some embodiments, the image is a frame of a video of the examination environment. In some embodiments, when the machine learning model indicates that the image includes a prohibited item, the method applies the one or more machine learning models to subsequent frames of the video to verify whether the subsequent frames include that prohibited item. In some embodiments, the one or more machine learning models include machine learning models for different types of prohibited items. In some embodiments, the one or more machine learning models are trained using images of prohibited items labeled with the type of the prohibited item. In some embodiments, the method further acquires an examinee image of an examinee and applies a machine learning model to the examinee image to determine whether the examinee has an examinee prohibited item. In some embodiments, the examinee prohibited item is an earphone. In some embodiments, the examinee prohibited item is a pair smartglasses. In some embodiments, the examinee prohibited item is a smartwatch. In some embodiments, the method further acquires an examinee image of the examinee, accesses an authoritative image of the examinee, and determines whether the examinee image and the authoritative image are of the same person. In some embodiments, the determining of whether the examinee image and the authoritative image are of the same person includes inputting the images into a machine learning model that outputs an indication of whether the images are of the same person. In some embodiments, the machine learning model is trained using training data that include images of a person with dark skin with a dark background and images of a person with light skin with a light background. In some embodiments, the authoritative image is part of a government-issued identification. In some embodiments, the one or more machine learning models output an indication of whether the image includes a required item.

In some embodiments, one or more computing systems are provided to perform a validation of an examination environment. The one or more computing systems include one or more computer-readable storage mediums storing computer-executable instructions for controlling the one or more computing systems and one or more processors for executing the computer-executable instructions stored in the one or more computer-readable storage mediums. The instructions acquire images of the examination environment and apply a machine learning model to the images to output an indication of whether the images include an item of a designated type. The machine learning model may be trained using images of the item labeled with an indication of whether the image includes the item. The instructions determine whether the validation has passed based on whether an image includes the item and notify a proctor of whether the validation has not passed. The notifying includes providing the images. In some embodiments, a machine learning model is a convolutional neural network. In some embodiments, a machine learning model is trained using a generative adversarial network. In some embodiments, the determination is based on a moving window of images. In some embodiments, the instructions further acquire an examinee image of an examinee and apply a machine learning model to the examinee image to determine whether the examinee has an examinee prohibited item. In some embodiments, the instructions further acquire an examinee image of the examinee, access an authoritative image of the examinee, and determine whether the examinee image and the authoritative image are of the same person.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. One or more computing systems to perform a validation of an examination environment, the one or more computing systems comprising:
   one or more computer-readable storage mediums storing computer-executable instructions for controlling the one or more computing systems to:
   acquire images of the examination environment;
   apply a first machine learning model to the images to output an indication of whether the images include an item of a designated type, the machine learning model trained using images of the item labeled with an indication of whether the image includes the item;
   responsive to the output indicating a presence of the item within a particular image of the images, apply a second machine learning model to a subsequent image of the images to verify the presence of the item,
   wherein the subsequent image is generated subsequent to the particular image, and
   wherein the presence of the item is verified using an aggregate probability of the particular image and the subsequent image including the item;
   determine whether the validation has passed based on whether an image includes the item; and notify a proctor of whether the validation has not passed, the notifying including providing: 1) the indication that the images fail to contain the item and 2) one or more of the images containing the item; and
one or more processors for executing the computer-executable instructions stored in the one or more computer-readable storage mediums.

2. The one or more computing systems of claim 1 wherein the machine learning model is: a convolutional neural network or a generative adversarial network.

3. The one or more computing systems of claim 1 wherein the determination is based on a moving window of the images.

4. The one or more computing systems of claim 1 wherein the instructions further acquire an examinee image of an examinee and apply a machine learning model to the examinee image to determine whether the examinee has an examinee prohibited item.

5. The one or more computing systems of claim 1 wherein the instructions further acquire an examinee image of the examinee, access an authoritative image of the examinee, and determine whether the examinee image and the authoritative image are of the same person.

6. A method performed by one or more computing systems to perform a validation of an examination environment, the method comprising:
acquiring a set of images of the examination environment during an examination;
applying a first set of machine learning models to the set of images to output an indication of whether one or more images of the set of images includes a prohibited item and an indication of whether the one or more images of the set of images includes a required item,
wherein one or more machine learning models of the first set of machine learning models are trained using images of items labeled with the indication of whether each of the images includes the prohibited item or the indication of whether each of the images includes the required item;
responsive to the output indicating a presence of the item within a particular image of the set of images, apply a second set of machine learning models to a subsequent image of the set of images to verify the presence of the item,
wherein the subsequent image is generated subsequent to the particular image, and
wherein the presence of the item is verified using an aggregate probability of the particular image and the subsequent image including the item;
determining whether the validation has passed based on the indication of: (1) whether the one or more images of the set of images includes the prohibited item and (2) whether the one or more images of the set of images includes the required item; and
notify a proctor of whether the validation has not passed, the notifying including providing: 1) the indication of whether the one or more images of the set of images includes the prohibited item and 2) an indication of whether the one or more images of the set of images includes the required item,
wherein one or more of the images in the set of images include one or more of: the prohibited item or the required item.

7. The method of claim 6 wherein the set of images are a set of frames of a video of the examination environment.

8. The method of claim 6 further comprising:
acquiring an examinee image of an examinee;
accessing an authoritative image of the examinee; and
determining whether the examinee image and the authoritative image are of the same person,
wherein the determining of whether the examinee image and the authoritative image are of the same person includes inputting the examinee image and the authoritative image into a third set of machine learning models that outputs an indication of whether the examinee image and the authoritative image are of the same person.

9. A method performed by one or more computing systems to perform a validation of an examination environment, the method comprising: acquiring images of the examination environment; applying a first machine learning model to the images to output an indication of whether the images include an item of a designated type, the first machine learning model trained using images of the item labeled with an indication of whether the image includes the item; responsive to the output indicating a presence of the item within a particular image of the images, applying a second machine learning model to a subsequent image of the images to verify the presence of the item, wherein the subsequent image is generated subsequent to the particular image, and wherein the presence of the item is verified using an aggregate probability of the particular image and the subsequent image including the item; determining whether the validation has passed based on whether an image includes the item; and notifying a proctor of whether the validation has not passed, the notifying including providing: 1) the indication that the images fail to contain the item and 2) one or more of the images.

10. The method of claim 9 wherein at least one of the first machine learning model or the second machine learning model is: a convolutional neural network or a generative adversarial network.

11. The method of claim 9 wherein the image is a frame of a video of the examination environment.

12. The method of claim 11 wherein when the first machine learning model indicates that the images fail to contain the item, applying the second machine learning model to subsequent frames of the video to verify whether the subsequent frames include that prohibited item.

13. The method of claim 9 wherein at least one of the first machine learning model or the second machine learning model include machine learning models for different types of prohibited items.

14. The method of claim 9 wherein at least one of the first machine learning model or the second machine learning model are trained using images of prohibited items labeled with a type of the prohibited item.

15. The method of claim 9 further including acquiring an examinee image of an examinee and applying a third machine learning model to the examinee image to determine whether the examinee has an examinee prohibited item.

16. The method of claim 15 wherein the examinee prohibited item is one or more of: an earphone, a pair of smartglasses, or a smartwatch.

17. The method of claim 9 further comprising acquiring an examinee image of the examinee, accessing an authoritative image of the examinee, and determining whether the examinee image and the authoritative image are of the same person.

18. The method of claim 17 wherein the determining of whether the examinee image and the authoritative image are of the same person includes inputting the images into a third machine learning model that outputs an indication of whether the images are of the same person.

19. The method of claim 18 wherein the third machine learning model is trained using training data that include images of a person with dark skin with a dark background and images of a person with light skin with a light background.

20. The method of claim 17 wherein the authoritative image is part of a government-issued identification.

* * * * *